United States Patent
Balemboy et al.

(10) Patent No.: US 9,290,279 B2
(45) Date of Patent: Mar. 22, 2016

(54) LANDING SYSTEM FOR A BODY AND SPACE PROBE PROVIDED WITH SUCH A SYSTEM

(75) Inventors: Christophe Balemboy, Merignac (FR); Mark Kinnersley, Bremen (DE); Robert Andre Laine, Paris (FR); Xavier Sembely, Toulouse (FR)

(73) Assignee: ASTRIUM SAS, Paris (FR)

( * ) Notice: Subject to any disclaimer, the term of this patent is extended or adjusted under 35 U.S.C. 154(b) by 6 days.

(21) Appl. No.: 13/376,231

(22) PCT Filed: May 28, 2010

(86) PCT No.: PCT/EP2010/057393
§ 371 (c)(1),
(2), (4) Date: Mar. 9, 2012

(87) PCT Pub. No.: WO2010/139617
PCT Pub. Date: Dec. 9, 2010

(65) Prior Publication Data
US 2012/0153077 A1    Jun. 21, 2012

(30) Foreign Application Priority Data
Jun. 4, 2009    (FR) ...................................... 09 53705

(51) Int. Cl.
*B64G 1/62*    (2006.01)
*B64G 1/10*    (2006.01)

(52) U.S. Cl.
CPC .......... *B64G 1/62* (2013.01); *B64G 2001/1071* (2013.01)

(58) Field of Classification Search
CPC ........................................................ B64G 1/62
USPC ................................ 244/158.1, 158.9, 100 R
See application file for complete search history.

(56) References Cited

U.S. PATENT DOCUMENTS

| | | | | |
|---|---|---|---|---|
| 3,175,789 A | * | 3/1965 | Blumrich | 244/100 R |
| 5,265,829 A | | 11/1993 | Roberts | |
| 5,366,181 A | * | 11/1994 | Hansen | 244/104 R |
| 6,227,494 B1 | * | 5/2001 | Turner | 244/172.6 |
| 8,413,927 B2 | * | 4/2013 | Buchwald et al. | 244/100 R |
| 2003/0208303 A1 | | 11/2003 | Okamoto et al. | |

OTHER PUBLICATIONS

International Search Report, dated Jul. 22, 2010, from corresponding PCT application.

* cited by examiner

*Primary Examiner* — Timothy D Collins
*Assistant Examiner* — Keith L Dixon
(74) *Attorney, Agent, or Firm* — Young & Thompson

(57) ABSTRACT

A landing system of a body and a space probe provided with such a system for landing on a bearing ground. The landing system includes landing legs (5), each with a footpad (6) at the end thereof, intended for braking the landing impact of the body when coming into contact with the ground and for supporting the body on the ground after landing. The footpads (6) are not coplanar.

20 Claims, 1 Drawing Sheet

LANDING SYSTEM FOR A BODY AND SPACE PROBE PROVIDED WITH SUCH A SYSTEM

This invention relates to a landing system of a body on a bearing ground. The invention also relates to a space vehicle such as a space probe, provided with such a landing system for exploring celestial bodies with landing.

Landing devices for space probes are known, comprising several landing legs positioned in a symmetrical configuration, each of these legs having a footpad placed at the end thereof. These devices act to correctly absorb the residual speed of the space probe upon contact of the probe with the ground so as to ensure the survival of this probe.

However, the configuration of the landing site of a space probe is typically unknown or little known beforehand. Indeed, even in the event of existing readings such as images of the celestial body on which the probe must land, these readings are often taken from distances not enabling a very detailed assessment of the relief of the surface of the landing site. Moreover, the landing attitude of a space probe cannot be exact due to the mechanical environmental conditions (vibrations, shocks, etc.) and possibly, due to very severe environmental restrictions (temperatures on the shield) that the probe may encounter during its descent towards the ground of the celestial body.

The landing legs are, therefore, dimensioned to take into account two cases of extreme landing for the space probe.

Firstly, the landing of the space probe can occur as per the direction of a single landing leg.

Each landing leg of the probe is, therefore, dimensioned to be capable of singly supporting the initial contact shock between the probe and the ground of the celestial body. The dimensioning of each landing leg therefore makes it capable of singly absorbing the total impact energy from the landing.

Inversely, all landing legs of the space probe can operate in parallel during landing. These landing legs and their associated footpad are identical in length so that they simultaneously come into contact with the surface of the ground.

The dimensioning of the landing legs must therefore take into account a peak deceleration limit that the space probe can experience at the time of landing.

This peak deceleration limit is made necessary by the constant concern of preventing the space probe from becoming structurally damaged, in addition to the payload transported by the latter, due to landing too quickly.

Finally, the stability of the space probe at the surface of the ground of the celestial body is heightened by the increase in the number of landing legs supporting this probe. Therefore, space probes are sought after with a high number of landing legs.

However, it is difficult to find a compromise between the initial high damping capacity that each landing leg must possess in the event of singly absorbing the landing impact and the low level of total stiffness required for all landing legs in the event of simultaneous contact of the latter with the ground.

The dimensioning criteria for the landing legs for a multi-contact landing also involves an increase in the mass of the landing device varying in $n^{3/2}$, where n is the number of landing legs of the landing device.

Therefore the increase in stability of space probes appears incompatible with the permanent concern for reducing the mass of these probes.

It is therefore very interesting to provide a landing system enabling the high stability of the space probe on the ground of a celestial body while minimising the increase in mass of this system, associated with an increase in the number of landing legs.

The purpose of this invention is therefore to offer a landing system of a body, simple in design and in its mode of operation, reliable and guaranteeing a stable support for this body on the surface of the ground, without increasing the restrictions on the payload that can be transported by this body.

The invention also relates to a space vehicle such as a space probe, provided with such a landing system for exploring, with landing, celestial bodies with a bearing ground, this bearing ground capable of being solid.

For this purpose, the invention relates to a landing system of a body comprising landing legs, each with a footpad at the end thereof, for braking the landing impact of said body when coming into contact with the ground and for supporting this body on the ground after landing.

According to the invention, said footpads are not coplanar.

Therefore, all footpads or ends of this landing system are not located within the same plane.

In different embodiments of this landing system, this invention also relates to the following characteristics, which must be considered singly or according to any combinations technically possible:

with the number of landing legs being more than or equal to 4, the footpads of these landing legs define several possible planes of contact with the ground, each of these planes containing the footpads of at most three of these landing legs so that the number of landing legs capable of simultaneously coming into contact with the ground during the landing of the body is between 1 and 3 at most, The "landing of said body" implies the phase during which the flying body comes into contact with the ground via one or several landing legs and their associated footpad of its landing system, the footpads of the latter simultaneously coming into contact with the ground if plural, these playing the role of a shock absorber for the flying body.

The "planes of contact with the ground" thus defined represent the different possibilities for the footpads of said landing legs to make contact with the ground during this landing. For illustration purposes only, the number of possible planes containing the footpads of three landing legs varies as $C_{n3}=n!/3!\times(n-3)!$, where n is the number of landing legs of the landing system.

After landing and according to the land topography, the body can find itself in an unstable position and therefore move to a stable position in which the number of landing legs simultaneously in contact with the ground is different.

Therefore, each landing leg is dimensioned so as to decelerate the body during the landing impact according to a hypothesis of simultaneous contact with the ground of at most three landing legs.

In the example provided for illustration purposes only, where the landing system comprises six landing legs alternating three legs with their corresponding footpad of identical length d and three legs with their corresponding footpad of identical length l with d>l, the maximum damping stiffness of the landing system only therefore cumulates three landing legs whereas the stability of the system is that of a configuration containing six landing legs.

these planes of contact are inclined in an angular range of at most between −20° and +20° compared to a horizontal plane, and even better between −10° and +10° compared to a horizontal plane, In this example, "horizontal plane" implies the plane passing through the footpads of the landing legs each having the same incline compared to said body and the same length of the landing leg/footpad assembly, i.e. a fully symmetrical landing system.

at least some of the assemblies, each comprising a landing leg and its corresponding footpad, have different lengths, In other words, in the example where all footpads are identical, the lengths of some landing legs of the landing system are different. This length is determined in the position taken by each of these assemblies.

with the number n of said landing legs being between 4 and 6, the system comprises 3 assemblies of an identical length L and (n−3) assemblies of an identical length d with L>d, As specified herein above, each of these assemblies comprises a landing leg and its corresponding footpad.

with these landing legs and their corresponding footpad having identical lengths and being intended to be connected to the lower part of this body, the main axis of at least some of these landing legs forms an angle of inclination with the lower part of this body, which is different in each case so that these footpads are not located within the same horizontal plane, with said landing legs being intended to be connected to the lower part of said body, at least two of said landing legs and their corresponding footpad are identical in length however have a different angle of inclination of their main axis with said lower part so that the footpads of these landing legs are not located within the same horizontal plane and at least two other of said landing legs have an identical angle of inclination of their main axis with said lower part so that the footpads of these landing legs are located within the same horizontal plane, while having landing legs, with their corresponding footpads, of different lengths, each of said landing legs comprises damping means to absorb at least one part of the landing impact energy.

These damping means are, therefore, dimensioned for each landing leg taking into account that this landing leg can singly come into contact with the ground during landing and therefore absorb the landing impact, or that in extreme cases, at most three of said landing legs of the landing system will simultaneously come into contact with the surface of said ground via their footpad and all three absorb the landing impact.

These damping means are, for example, viscoelastic or inelastic deformable elements, which absorb substantial quantities of energy via viscoelastic or inelastic deformation.

The invention also relates to a space vehicle for transporting at least one payload.

According to the invention, this space vehicle is fitted with a landing system of a body as previously described.

The invention further relates to a reusable platform for transporting at least one payload.

According to the invention, this platform is fitted with a landing system of a body as previously described.

This reusable platform can comprise attachments to attach the platform to flexible junction components such as cables so that the platform can be lifted and moved by a coupling member such as a hoisting hook or ring of a crane. These attachments, which can be rings, are placed in each corner of the platform for example.

The platform can be a flat support such as a perforated or non-perforated floor. For illustration purposes only, this floor is metallic.

Moreover, the invention relates to a reusable recipient for transporting at least one payload.

According to the invention, this recipient is fitted with a landing system of a body as previously described.

This recipient can be a container. For illustration purposes only, this container can comprise a deployable parachute for transportation and deployment by aircraft. The landing system with which this container is fitted, aims at protecting the payload contained within this container and the integrity of the container.

The invention will be described in more detail with reference to the appended figures, in which.

Figure 1:
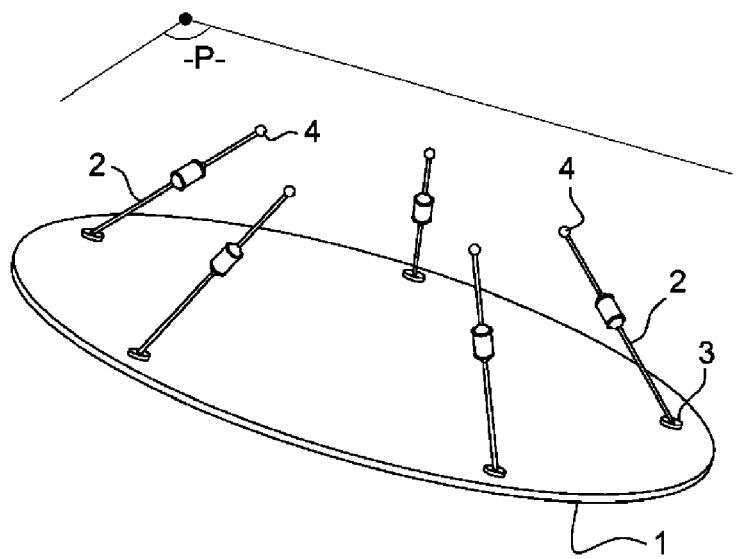
FIG. 1 is a perspective view of a landing system from the prior art, this system having a symmetrical configuration.

FIG. 1 is a perspective view of a landing system of a space probe from the prior art. Only the lower part of this probe 1 is represented for clarity purposes. This landing system comprises landing legs 2 connected by one of their ends 3 to the lower part of this probe 1. Each landing leg 2 comprises a footpad 4 at its other end.

Given that these landing legs 2 and their corresponding footpad 4 are identical in length, the footpads 4 of these landing legs define a single plane of contact P of the probe with the ground. This configuration for the landing legs 2 and their corresponding footpad is known as symmetrical.

Therefore, to the nearest deviation from flatness of the ground, all of the footpads 4 are in contact with the ground upon the landing of the space probe.

Figure 2:
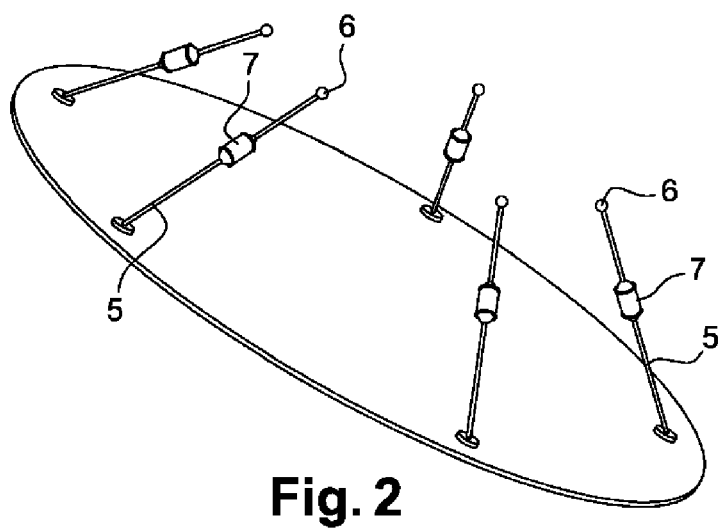
FIG. 2 is a perspective view of a landing system according to one preferred embodiment of the invention.

FIG. 2 is a perspective view of a landing system according to one preferred embodiment of the invention. This landing system comprises landing legs 5 at the end of which a footpad 6 is located. Furthermore, each landing leg 5 comprises damping means 7 for absorbing the landing impact.

The number of landing legs 5 of this system being equal to five, two of these landing legs 5 and their corresponding footpad 6 have an identical length d and the three remaining landing legs 5 with their corresponding footpad have an identical length L with L>d.

These assemblies each comprising a landing leg 5 and its associated footpad 6, different in length, thus define several possible planes of contact with the ground, each of these planes passing through the footpads 6 of at most three of these landing legs 5 so that the number of landing legs 5 capable of simultaneously coming into contact with the ground via their footpad 6 during the landing of the space probe is 1, 2 or 3 at most.

With three long landing leg/associated footpad assemblies and two shorter landing leg/associated footpad assemblies, the following contact possibilities arise:

the footpads of the three long landing leg/associated footpad assemblies touch the ground with the footpads of the two shorter assemblies remaining receded, the footpads of two long landing leg/associated footpad assemblies touch the ground in addition to the footpad of a short landing leg/associated footpad assembly, the remaining long landing leg/associated footpad assembly and the other short assembly remain receded, in addition to variations of the latter case, for example by considering a short landing leg/associated footpad assembly which does not remain receded, however which touches the surface of the ground in this case.

Therefore, by adapting the differences in length of the landing legs 5 and/or of their corresponding footpad 6 to their number, it can be ensured that only three landing legs 5 at most play the role of the shock absorbers.

After absorbing the impact, given that these three landing legs do not necessarily correspond to a stable position of balance, the assembly can move to a stable position involving a different number of landing legs, the footpad of which is in contact with the ground.

Finally, it is observed that in order for the space probe fitted with this landing system to decelerate, each landing leg 5 must be dimensioned using a hypothesis based on the simultaneous contact of a maximum of three footpads, i.e. three landing legs at most. This therefore limits the mass of the landing system compared to the prior art.

That which has been demonstrated for assemblies, the length of which can vary, each of these assemblies comprising a landing leg and its corresponding footpad, can also be obtained in a more general manner by ensuring that all of the footpads can have an angle of inclination in relation to the flying body and different lengths of the landing leg and corresponding footpad assembly, provided that any plane of contact thus formed contains 3 footpads at most.

The invention claimed is:

1. A landing system of a body comprising:
   four or more landing legs (5) for breaking the landing impact of said body when coming into contact with the ground and for supporting said body on the ground after landing, and
   a footpad at an end of each of said landing legs,
   wherein the assembly of said landing legs is intended to be connected to the lower part of said body, and
   wherein, with plural of said footpads resting on a planar surface, said footpads (6) of all of said four or more landing legs (5) are not coplanar.

2. A system according to claim 1, wherein said footpads (6) define several possible planes of contact with the ground, each of said planes containing the footpads (6) of at most three of said landing legs (5) so that the number of said landing legs (5) simultaneously coming into contact with a planar ground surface at a time of the landing impact of said body is between 1 and 3 at most.

3. A system according to claim 2, characterised in that said planes of contact are inclined in an angular range of at most between −20° and +20° compared to a horizontal plane.

4. A system according to claim 1, characterised in that at least some of the assemblies each comprising a landing leg (5) and its corresponding footpad (6), have, prior to coming into contact with the ground, different lengths.

5. A system according to claim 4, characterised in that, with the number n of said landing legs (5) being between 4 and 6, the system comprises, prior to coming into contact with the ground, 3 assemblies of an identical length L and (n−3) assemblies of an identical length d with L>d.

6. A system according to claim 1, characterised in that, with said landing legs (5) and their corresponding footpad (6) having identical length and being intended to be connected to the lower part of said body (1), the main axis of at least some of said landing legs (5), prior to coming into contact with the ground, forms an angle of inclination with said lower part, which is different in each case so that the footpads (6) of said landing legs (5) are not located within the same horizontal plane.

7. A system according to claim 1, characterised in that, with said landing legs (5) being intended to be connected to the lower part of said body, at least two of said landing legs and their corresponding footpad (5) are identical in length however have a different angle of inclination of their main axis with said lower part so that the footpads (6) of said landing legs (5) are not located within the same horizontal plane and in that at least two other of said landing legs (5) have an identical angle of inclination of their main axis with said lower part so that the footpads (6) of said landing legs (5) are located within the same horizontal plane, while having landing legs, with their corresponding footpad (6), of different lengths.

8. A system according to claim 1, characterised in that each of said landing legs (5) comprises damping means (7) to absorb at least one part of the landing impact energy.

9. A space vehicle for transporting at least one payload, fitted with a landing system of a body according to claim 1.

10. A reusable recipient for transporting a payload, fitted with a landing system of a body according to claim 1.

11. A system according to claim 2, characterised in that at least some of the assemblies each comprising a landing leg (5) and its corresponding footpad (6), have different lengths.

12. A system according to claim 2, characterised in that, with said landing legs (5) and their corresponding footpad (6) having identical length and being intended to be connected to the lower part of said body (1), the main axis of at least some of said landing legs (5), prior to coming into contact with the ground, forms an angle of inclination with said lower part, which is different in each case so that the footpads (6) of said landing legs (5) are not located within the same horizontal plane.

13. A system according to claim 2, characterised in that, with said landing legs (5) being intended to be connected to the lower part of said body, at least two of said landing legs and their corresponding footpad (5) are identical in length however have a different angle of inclination of their main axis with said lower part so that the footpads (6) of said landing legs (5) are not located within the same horizontal plane and in that at least two other of said landing legs (5) have an identical angle of inclination of their main axis with said lower part so that the footpads (6) of said landing legs (5) are located within the same horizontal plane, while having landing legs, with their corresponding footpad (6), of different lengths.

14. A system according to claim 3, characterised in that at least some of the assemblies each comprising a landing leg (5) and its corresponding footpad (6), have different lengths.

15. A system according to claim 3, characterised in that, with said landing legs (5) and their corresponding footpad (6) having identical length and being intended to be connected to the lower part of said body (1), prior to coming into contact with the ground, the main axis of at least some of said landing legs (5) forms an angle of inclination with said lower part, which is different in each case so that the footpads (6) of said landing legs (5) are not located within the same horizontal plane.

16. A system according to claim 3, characterised in that, with said landing legs (5) being intended to be connected to the lower part of said body, at least two of said landing legs and their corresponding footpad (5) are identical in length however have a different angle of inclination of their main axis with said lower part so that the footpads (6) of said landing legs (5) are not located within the same horizontal plane and in that at least two other of said landing legs (5) have an identical angle of inclination of their main axis with said lower part so that the footpads (6) of said landing legs (5) are located within the same horizontal plane, while having landing legs, with their corresponding footpad (6), of different lengths.

17. The landing system of claim 1, wherein,
   prior to coming into contact with the ground, with the landing legs (5) and each footpad (6) positioned for breaking the landing impact of said body coming into contact with a planar ground surface, all of said that footpads (6) are not located in any same plane.

18. The landing system of claim 1, wherein, with the landing legs (5) and each corresponding footpad (6) in a deployed position for breaking the landing impact of said body of coming into contact with the ground:

i) all of said that footpads (6) are not located in any same plane, and ii) an overall length (L) of a first of the landing legs (5) including the corresponding footpad (6) is greater than an overall length (d) of a second of the landing legs (5) including the corresponding footpad (6).

19. The landing system of claim 17, wherein, with the landing legs (5) and each footpad (6) positioned for breaking the landing impact of said body and prior to coming into contact with the ground:

i) an overall length (L) of three of the landing legs (5) inclusive of the corresponding footpads (6) is greater than an overall length (d) of another two of the landing legs (5) inclusive of the corresponding footpad (6), and ii) the footpads (6) of the landing legs (5) define plural possible planes of contact with the ground, each of the planes of contact containing the footpads of at most three of the landing legs so that the number of landing legs simultaneously coming into contact with the ground during the landing of the body is no more than three (3).

20. The landing system of claim 17, wherein, with the landing legs (5) and each footpad (6) positioned for breaking the landing impact of said body and prior to coming into contact with the ground, an overall length (L) of a first group of the landing legs (5) inclusive of the corresponding footpads (6) is greater than an overall length (d) of a second group of the landing legs (5) inclusive of the corresponding footpad (6), and the first group of the landing legs has a greater number of landing legs than the second group of landing legs.

* * * * *